United States Patent [19]
Maruyama

[11] Patent Number: 6,088,996
[45] Date of Patent: *Jul. 18, 2000

[54] HEAT-SEAL APPARATUS

[75] Inventor: Ichiro Maruyama, Toyonaka, Japan

[73] Assignee: Fuji Impulse Co., Ltd., Toyonaka, Japan

[*] Notice: This patent issued on a continued prosecution application filed under 37 CFR 1.53(d), and is subject to the twenty year patent term provisions of 35 U.S.C. 154(a)(2).

[21] Appl. No.: 09/132,437

[22] Filed: Aug. 11, 1998

[30] Foreign Application Priority Data

May 28, 1998 [JP] Japan ................................. 10-146745

[51] Int. Cl.⁷ ..................................................... B65B 51/10
[52] U.S. Cl. ........................ 53/373.7; 53/375.9; 53/373.8
[58] Field of Search ............................... 53/373.7, 373.8, 53/373.9, 477, 375.9, 390; 219/424, 425, 449, 436, 472, 524, 530

[56] References Cited

U.S. PATENT DOCUMENTS 4,945,712  8/1990  Bennett ................................. 53/373.9
5,239,808  8/1993  Wells et al. ........................... 53/373.7
5,880,435  3/1999  Bostic .................................... 219/530

FOREIGN PATENT DOCUMENTS 0139322  5/1990  Japan ................................... 53/373.7
2563166  8/1993  Japan .

*Primary Examiner*—Eugene Kim
*Attorney, Agent, or Firm*—Muramatsu & Associates

[57] ABSTRACT

A heat-seal apparatus having an improved structure for easily replacing a heater therein. The heat-seal apparatus includes a crimping lever, a base portion for grasping and crimping the sealed portion of a sealed substance with the crimping lever to heat and seal the sealed portion, a heater mounted to the base portion for heating and sealing the sealed portion, a slackness preventing means for preventing slackness caused by thermal expansion of the heating portion, and a means for easily removing and mounting the heating portion which achieves easy removal and mounting the heating portion by pressing back and correcting displacement of the heating portion by the slackness preventing means when the crimping lever portion is separated and held open from the base portion.

14 Claims, 3 Drawing Sheets

HEAT-SEAL APPARATUS

BACKGROUND OF THE INVENTION

1. Field of the Invention

The present invention relates to a heat-seal apparatus, and more specifically, to a heat-seal apparatus which linearly heat-fuses the sealed portion of packages made from thermoplastic resins, such as polyethylene, etc.

2. Description of the Related Art

Conventionally, this kind of heat-seal apparatus comprises a crimping lever portion which can be opened upwards around the fulcrum formed on one end of a base portion equipped with a linear heater. When the sealed portion of the package is grasped between the crimping lever portion and the base portion, the apparatus is automatically excited and heated, and the sealed portion is fused to be sealed. In such event, since a linear heater comprising metal heating elements is used for a heating portion, the linear heater thermally expands when heated and extends in the longitudinal direction. As the heat-seal apparatus is more and more frequently used, the heater extends more and more in the longitudinal direction, but when the apparatus grasps the sealed portion of the package with the linear heater heated and thermally expanded, slackness is caused in the heater and the heater comes in contact with the sealed portion. As a result, the sealed portion is not thermally fused into a specified size or an overheated portion is generated in part of the sealed portion, causing fusion failure to result. In addition, the heater itself may be bent due to slackening and the bent portion may be damaged.

Therefore, considering the fact that the heater begins to thermally expand as heating takes place when the sealed portion of the package is grasped between the crimping lever portion and the base portion, tension is allowed to constantly be exerted to the longitudinal direction of the heater so that slackening of the heater associated with heating is not generated.

However, because in the heat-seal apparatus of the conventional technique, tension is allowed to be exerted on the heater, the operation to detach or tighten to fix the fixing members such as screws, etc. for mounting the heater in place becomes troublesome when the heater is installed to assemble the heat-seal apparatus or the heater must be replaced. That is, because the two places on both ends in the longitudinal direction of the linear heater are intended to serve to allow strong contact between the heater and the electrode, the screw is fixed from above to the electrode portion located below using a screwdriver. However, when both ends of the heater are fixed to these electrodes with screws, fixing one end with a screw is achieved easily but the electrode which is the other screw fixing portion is not provided with sufficient space required for screw tightening because the electrode portion is located near the fulcrum of the crimping lever and because of the tension towards the crimping lever side exerted to the electrode portion. Consequently, the other electrode portion is tried to be raised against the tension applied towards the crimping lever side, but since the operation is carried out manually, a large force must be exerted and the operation is troublesome, resulting in poor workability. When the heater must be replaced due to disconnection of the heater, similar troublesome operation must be carried out.

Accordingly, it is a main object of this invention to provide a heat-seal apparatus which can solve the problems the conventional technique possesses, which does not cause slackness in the heater as the heater is heated, while enabling easy heater installation and replacement, and which achieves high workability at the time of installation and replacement.

SUMMARY OF THE INVENTION

The above object can be achieved by the inventions recited in claims. That is, the features and configuration of the heat-seal apparatus according to this invention comprise a means for heating to seal the sealed portion by grasping and crimping the sealed portion between the crimping lever portion and the base portion as well as for preventing the occurrence of slackness due to thermal expansion of the heating portion equipped to the base portion when heating and sealing this sealed portion, and a mechanism that can correct displacement of the heating portion by the slack preventing means and enables easy removal and mounting of the heating portion when the crimping lever portion is separated from the base portion and is held open.

When configured in this way, occurrence of fusion failure at the heat-fused portion of the sealed portion can be positively prevented by the existence of the means for preventing slackness caused by thermal expansion of the heating portion, and at the same time, easy removal and mounting of the heating portion is achieved and the workability is markedly improved because of the existence of the mechanism which enables easy removal and mounting of the heating portion when the heating portion is installed during the assembly of the apparatus or when the heating portion must be replaced during application.

As a result, a heat-seal apparatus which does not cause slackness in the heater as the heater is heated and enables easy mounting and replacement of the heater has been provided.

The means for preventing slackness by thermal expansion of the heating portion may be an energizing means for exerting tension to the longitudinal direction of the heating portion when the heating portion is heated, and the mechanism for enabling easy mounting and removal of the heating portion may be a pressurizing means for correcting displacement of the heating portion against the energization and displacement of the heating portion by the energizing means.

The heating portion gradually thermally-expands due to accumulation of heat, but when it is configured as described above, tension is constantly exerted in pursuit of the expansion of the heating portion and slackness does not occur, and good fusion to the sealed portion is constantly achieved. In addition, since the means for correcting energization and displacement of the heating portion is a pressurizing means, the construction is not complicated, making it possible to return the heating portion to the position where the heating portion can be positively and easily mounted and removed with a simple configuration.

In addition, it would be convenient if, in grasping and crimping the sealed portion, the pressurizing means is integrally formed with a switching means equipped with a function to be excited in linkage with the rotating motion of the crimping lever portion, and when the heating portion is excited with the crimping lever portion crimped to the base portion, the movement and displacement of the heating portion by the energizing means are not obstructed, but when the crimping lever portion is separated from the base portion and held open, movement and displacement of the heating portion are corrected.

If it is configured in this way, only with the operation of the crimping lever portion, the sealed portion can be automatically heated and fused and at the same time, slackness of the heating portion against thermal expansion in such event can be prevented, and furthermore, when it is not heated, the heating portion can be displaced and corrected in such a manner to enable easy removal and mounting of the heating portion.

The other effects of this invention will be described in detail hereinafter.

DETAILED DESCRIPTION OF THE PREFERRED EMBODIMENTS

Figure 1:
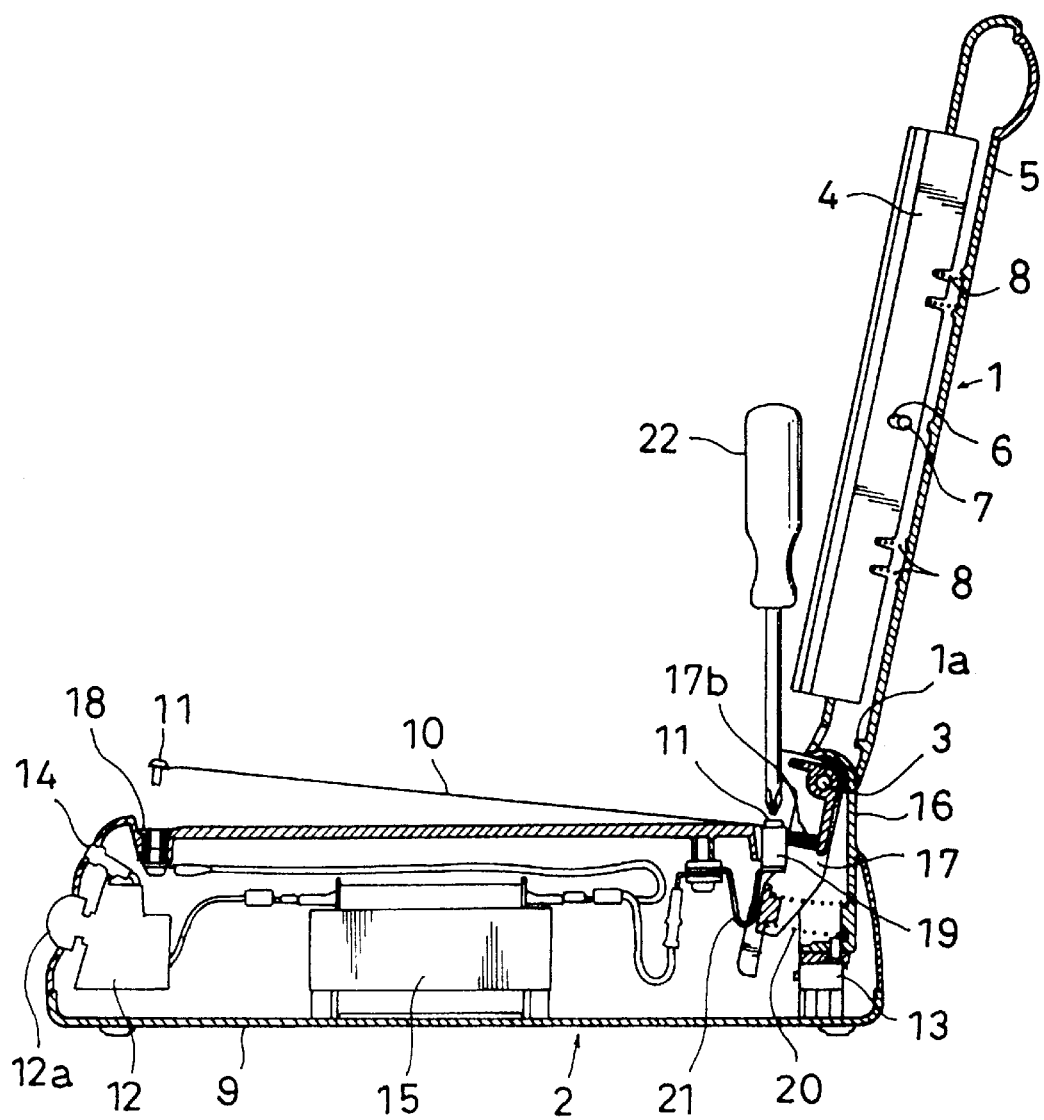
FIG. 1 is a front sectional view of a heat-seal apparatus according to this invention.

Referring now to the drawings, preferred embodiments of the heat-seal apparatus according to the invention will be described in detail hereinafter. As shown in FIG. 1, this heat-seal apparatus comprises a crimping lever portion 1 one end of which is free to be opened upwards around the fulcrum near the other end and a base portion 2 equipped with a linear heater 10 as a heating portion. FIG. 1 shows the condition where the crimping lever portion 1 is held open upwards from the base portion 2 around the pin 3 that composes the fulcrum. Between the crimping lever portion 1 and the base portion 2, though not illustrated, sealed portion of a heat-fusible package, sealed substance, is grasped and is heated and held for a specified time to be fused and sealed. When the crimping lever portion 1 is opened to the maximum, as shown in FIG. 1, the free end side reaches the rear side of the base portion 2 and achieves the opening angle exceeding 90° so that the sealed portion of the package can be easily mounted on the base portion 2.

The crimping lever portion 1 is equipped with a crimping portion 4 which comes in contact with the sealed portion and a lever portion 5 which can be grasped. Between the crimping portion 4 and the lever portion 5, a plurality of coil springs 8 for energizing the crimping portion 4 to protrude towards the base portion 2 are intervened. The crimping portion 4 is mounted to the lever portion 5 with a screw 7 which can be moved in the longitudinal direction of an elongated hole 6 formed nearly at the center of the longitudinal direction.

The base portion 2 is equipped with a casing 9 made from aluminum alloy and a heater 10 comprising linear heating elements is mounted on the top of the casing 9 along the longitudinal direction of the base portion 2 with a pair of screws 11. And inside the casing 9, there housed is an electric circuit for heating that comprises a timer 12 for controlling heating time of the heater 10, a micro-switch 13 for detecting the start of excitation of the heater 10 by the motion of the crimping lever portion 1, an indicator lamp 14 comprising LED, etc. that goes on when excited, a transformer 15 for changing voltage of the external commercial power supply (the input portion is not illustrated for simplification). The heater 10 comprises nichrome alloy wire about 2 mm wide, about 0.1 mm thick, and about 22 mm long. However, the heater configuration shall not be limited to this but the size can be properly changed in accord with the application purposes and for the kind of material of the heating element, the heating element comprising Kanthal alloy, etc. or others may be used.

The heater 10 has both ends in the longitudinal direction removably fixed to electrodes 18, 19 with a pair of screws 11. By driving and fixing the heater to the electrodes 18, 19 with these screws 11, occurrence of contact failure at this portion is positively prevented. Needless to say, any jigs other than screws may be used to fix the heater if it is a fixing system that does not cause any contact failure. The lower portion of the electrodes 18, 19 are connected to the secondary circuit of the transformer 15, respectively. The electrode 19 of the heater 10 at the end portion on the crimping lever portion side is constantly applied with tension for eliminatng slackness caused by elongation of length of the heater 10 in the direction for separating from the other electrode 18 with consideration given to the fact in that the length of the heater 10 is elongated by thermal expansion when the heater 10 is heated. That is, as a conductor to connect the electrode 19 with the transformer 15, a plate spring 21 with nearly U-letter cross section is adopted, and with this U-letter late spring 21, the other electrode 19 is constantly energized in the direction to separate from the electrode 18. Consequently, this U-letter plate spring 21 forms an energizing means which serves as a slackness preventing means for displacing the heater 10, the heating portion, and preventing slackness of the heater 10.

The timer 12 comprises a variable resistor which can vary the exciting time in accord with the type of the material to be sealed or thickness thereof, etc. A timer setting knob 12a is installed on the left side as seen from the front in FIG. 1, and by the user rotating the timer setting knob 12a, the exciting time can be easily changed.

In the base portion 1, at the end on the opposite side of the end to which the timer setting knob 12a is mounted, the crimping lever portion 1 is pivoted around a pin 3 as described above. This pin 3 passes through a resin bracket 16 mounted to the casing 9 of the base portion 2 and a switch lever 17, a resin switching means contained inside the bracket 16. This switch lever 17 is rotatably and freely fitted around the pin 3 and the bracket 16 is fixed to the pin 3.

Figure 2:
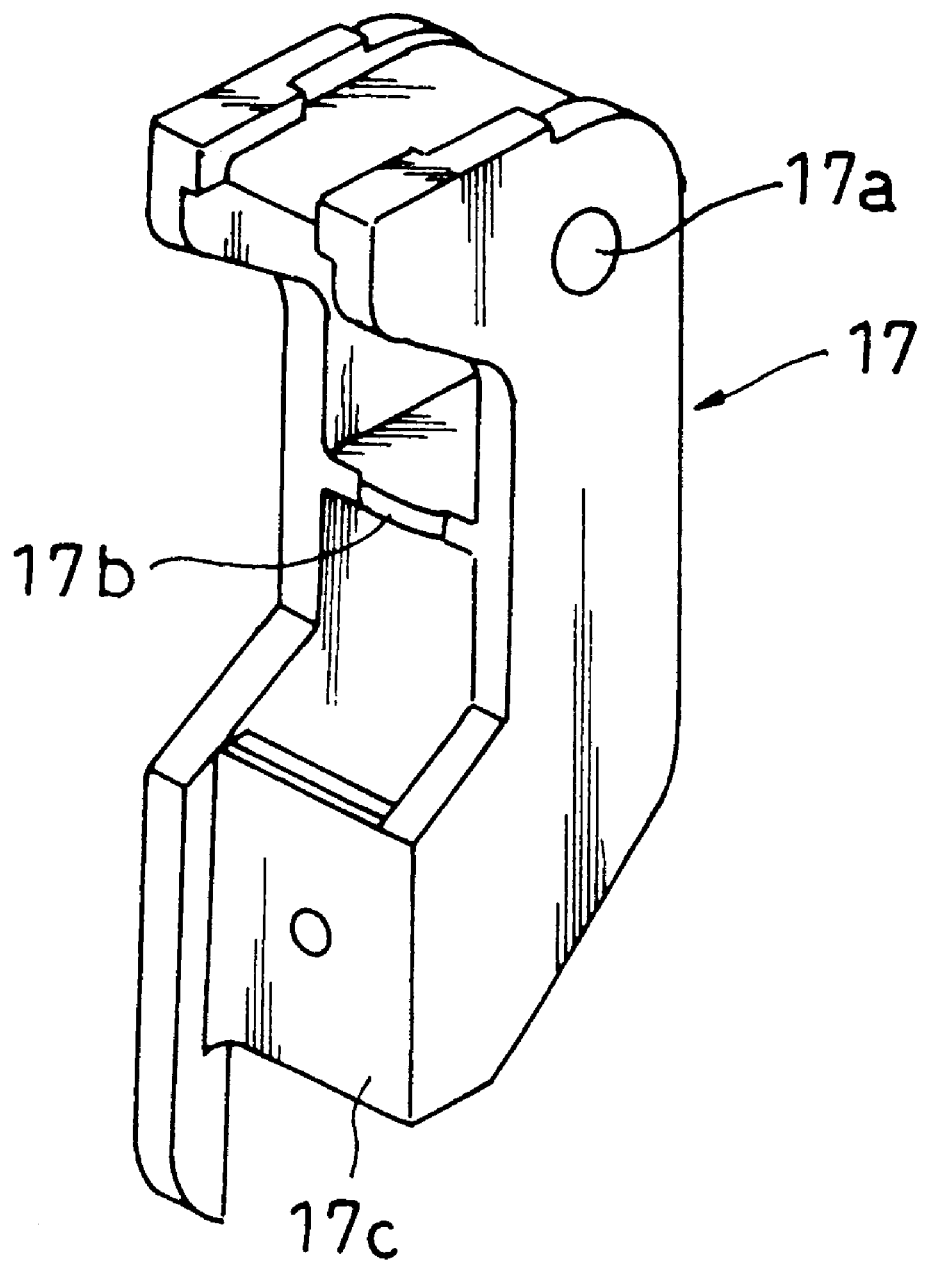
FIG. 2 is a perspective view of a switch lever used for this invention.

Next the switch lever 17 will be described in detail. This switch lever 17 has a cross section of a nearly inverted C-letter profile as shown enlarged in FIG. 2. This switch lever 17 is integrally formed by having a hole 17a that passes through the pin 3 at the upper portion and, at the intermediate height position, a protrusion 17b, and at the lower portion, a contact portion 17c pulled and energized by the coil spring 20 with the bracket 16. When the sealed portion of a package is not grasped, that is when the crimping lever portion 1 is held open upwards around the fulcrum 3, as described above, to the other electrode 19, tension is exerted in the direction to separate from the other electrode 18. Consequently, the top of the screw 11 originally driven to the other electrode 19 is slightly inclined and directed nearly parallel to the longitudinal direction of the crimping lever portion 1, but as shown in FIG. 1, because of the presence of the protrusion 17b, it directs nearly right over. That is, this protrusion 17b functions as a pressurizing means for pressing back and correcting the separation and displacement of the heater 10 against energization to the heater 10 by the U-letter plate spring 21. Consequently, when the linear heater 10 is replaced, etc., the tip end of the screwdriver 22 can be easily inserted into the top of the screw 11, making such operation extremely easy. After all, the pressurizing means forms a means for easily removing and mounting the heater 10 in the heating portion.

Figure 3:
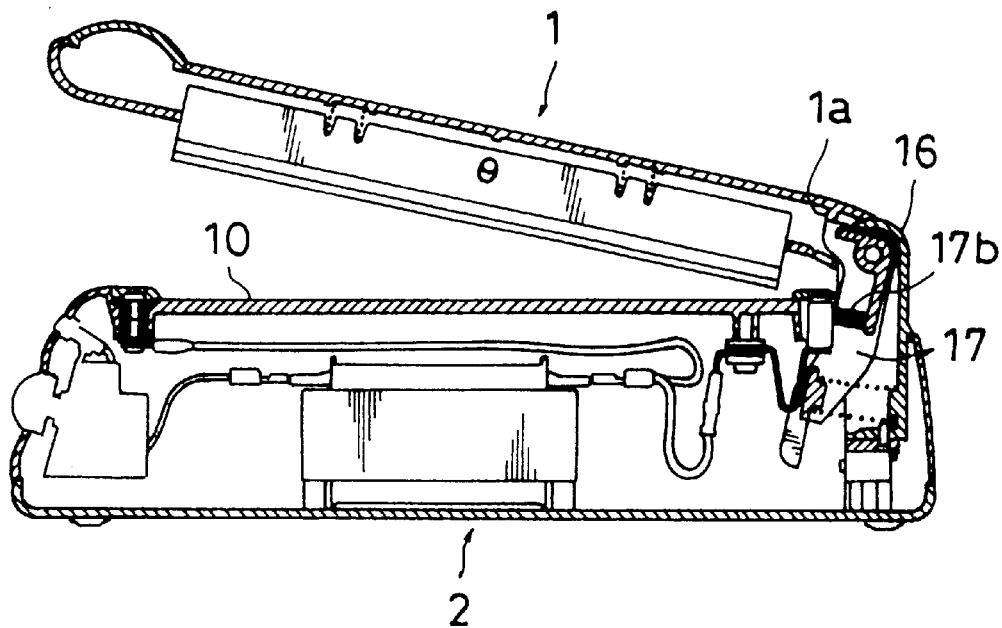
FIG. 3 is a front sectional view of a heat-seal apparatus according to this invention.
Figure 4:
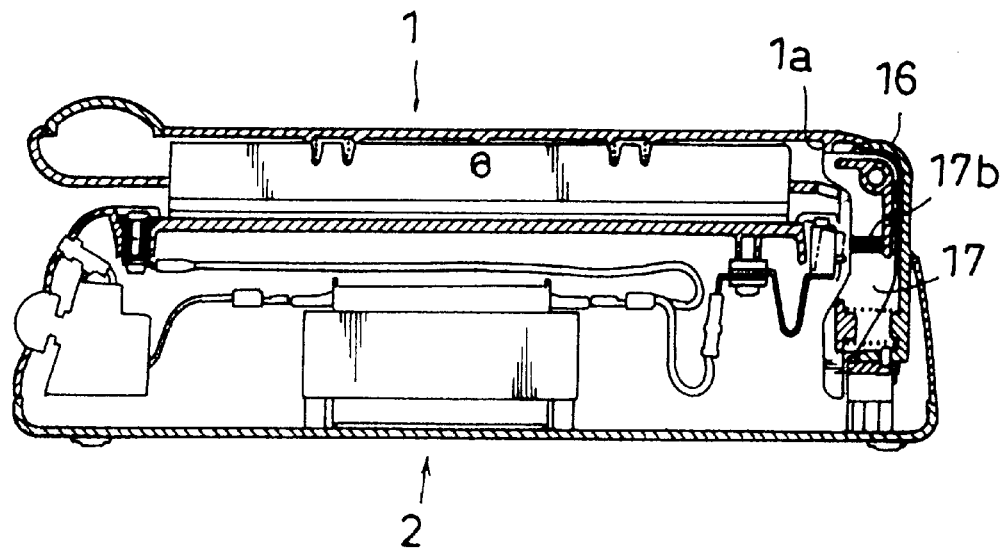
FIG. 4 is a front sectional view of a heat-seal apparatus according to this invention.

When the sealed portion of a package is grasped between the crimping lever portion 1 and the base portion 2 and crimped, the crimping lever portion 1 is lowered to come close to the base portion 2. When the crimping lever portion 1 is lowered to the position shown in FIG. 3, the protrusion 1a formed protruded towards the base portion 2 in the vicinity of the pin 3 of the crimping lever portion 1 comes in contact with the top surface of the switch lever 17. When the crimping lever portion 1 is further lowered towards the base portion 2, the protrusion 1a presses the top surface of the switch lever 17. And the switch lever 17 is rotated counterclockwise around the pin 3 and finally, as shown in FIG. 4, the crimping lever portion 1 comes in contact with the base portion 2 (when actually used, the sealed portion of a package is arranged between the crimping lever portion 1 and the base portion 2, but the package is omitted in FIG. 3 and 4 for simplification), the protrusion 17b of the switch lever 17 retracts in the direction separating from the other electrode 19. When the protrusion 17b retracts, tension to the heater 10 by the U-letter plate spring 21 begins to be exerted again, and the sealed portion can be crimped without slacking the heater 10 at the time of heating. When the sealed portion of a package is grasped and crimped between the crimping lever portion 1 and the base portion 2, the contact portion 17c of the switch lever 17 comes in contact with the micro-switch 13 by the coil spring 20 intervened between the bracket 16 and the switch lever 17, and this contact energizes the heater 10. Allowing the crimping lever portion 1 to come in contact with the base portion 2 in this way automatically excites, and grasps, crimps, and seals the sealed portion of a package.

Other Embodiment

In the above embodiment, allowing the crimping lever portion 1 to come in contact with the base portion 2 automatically excites, and grasps and crimps the sealed portion of a package, but this automatic excitation mechanism is not always required. The excitation switch may be mounted, for example, separately outside the base portion, and after the sealed portion arranged on the base portion is crimped by the crimping lever portion, the excitation switch may be operated and excited.

In the above embodiment, the commercial AC power supply is used for a power supply, but it may be formed in a battery built-in construction.

What is claimed is:

1. A heat-seal apparatus, comprising:
   a crimping lever portion;
   a base portion for grasping and crimping the sealed portion of a sealed substance with the crimping lever portion to heat and seal the sealed portion;
   a heating portion mounted on the base portion by a fastener means for heating and sealing the sealed portion;
   a slackness preventing means for preventing slackness caused by thermal expansion of the heating portion; and
   a means for easily removing and mounting the heating portion which achieves easy removal and mounting of the heating portion by pressing back the fastener means to an original position when the crimping lever portion is separated and held open from the base portion.

2. A heat-seal apparatus according to claim 1, wherein the means for preventing slackness due to thermal expansion of the heating portion is an energizing means for exerting tension to the longitudinal direction of the heating portion when the heating portion is heated and the means for easily removing and mounting the heating portion is a pressurizing means for pressing back and correcting displacement of the heating portion against energization and displacement of the heating portion by the energizing means.

3. A heat-seal apparatus according to claim 2, wherein the pressurizing means is integrally formed with a switching means equipped with a function for exciting in linkage with the rotating operation of the crimping lever portion when the sealed portion is grasped and crimped, and when the crimping lever portion is crimped to the base to excite the heating portion, the pressurizing means does not obstruct the movement and displacement of the heating portion by the energizing means but when the crimping lever portion is separated and held open from the base portion, the pressurizing means corrects the movement and displacement of the heating portion.

4. A heat-seal apparatus according to claim 3, wherein the crimping lever portion allows a free end side thereof to reach a rear of the base portion and achieves an opening angle exceeding 90° when the crimping lever is opened to the maximum.

5. A heat-seal apparatus according to claim 4, wherein the switching means has a cross section of nearly C-letter form, and is formed integrally with the pressuring means at an intermediate position thereof and is formed to integrally have a contact portion for carrying out exciting actions when pulled and energized.

6. A heat-seal apparatus according to claim 5,
   wherein a timer which can change the excitation time of the heating portion is provided.

7. A heat-seal apparatus, comprising:
   a crimping lever portion;
   a base portion for grasping and crimping the sealed portion of a sealed substance with the crimping lever portion to heat and seal the sealed portion;
   a heating portion mounted on the base portion by a fastener means for heating and sealing the sealed portion;
   a slackness preventing means for preventing slackness caused by thermal expansion of the heating portion; and
   a means for easily removing and mounting the heating portion, which is a pressuring means for pressing back the fastener means to an original position thereby correcting displacement of the heating portion and the fastener means against energization of the heating portion by the slackness preventing means when the crimping lever portion is separated and held open from the base portion.

8. A heat-seal apparatus, comprising:
   a base portion for placing a sealed portion of a sealed substance thereon;
   a crimping lever for grasping and crimping the sealed portion of a sealed substance in combination with the base portion, an end of said crimping lever being rotatably jointed with an end of the base portion;
   a heater removably mounted on the base portion for heating and sealing the sealed portion, an end of said heater near the rotatable joint being movably connected with a base portion by a fastener;
   a slackness preventing means for pulling the heater in a longitudinal direction of the heater to prevent the heater from slackening; and
   a switching means provided to the rotatable joint, an operation of the switching means being dependent upon the position of the crimping lever, wherein
   said switching means is provided with a pressing means for pressing back the heater together with the fastener so that the fastener is pressed back to an original position when the crimping lever is held open from the base portion.

9. A heat-seal apparatus according to claim 8, wherein said heater removably mounted on the base portion is connected with a plurality of electrodes of an electric power supply source of the heat-seal apparatus provided at both ends of the heater by using a plurality of fasteners, further wherein the electrode positioned near the rotatable joint and connected to the end of the heater is pulled by the slackness preventing means when the crimping lever is closed is pressed back by the pressing means of the switching means when the crimping lever is opened.

10. A heat-seal apparatus according to claim 8, wherein said fastener is formed of a screw.

11. A heat-seal apparatus according to claim 8, wherein the heater is prevented from slackening due to a thermal expansion of the same by the slackness preventing means.

12. A heat-seal apparatus according to claim 8, wherein the crimping lever allows a free end side thereof to reach a rear of the base portion and achieves an opening angle exceeding 90° when the crimping lever is opened to the maximum.

13. A heat-seal apparatus according to claim 8, wherein the switching means has a cross section of nearly a C-letter form and is formed integrally with the pressuring means at an intermediate position thereof.

14. A heat-seal apparatus according to claim 8, further including a timer for controlling an excitation time of the heater.

* * * * *